No. 708,892. Patented Sept. 9, 1902.

C. E. LONG.
SLIDING BOLT.
(Application filed Jan. 6, 1902.)

(No Model.)

Witnesses
A. M. Parkins.
J. A. MacDonald.

Inventor
Charles Ernest Long,
By his Attorneys,
Baldwin Davidson & Wight.

UNITED STATES PATENT OFFICE.

CHARLES ERNEST LONG, OF BRANNOCKSTOWN, IRELAND.

SLIDING BOLT.

SPECIFICATION forming part of Letters Patent No. 708,892, dated September 9, 1902.

Application filed January 6, 1902. Serial No. 88,668. (No model.)

*To all whom it may concern:*

Be it known that I, CHARLES ERNEST LONG, gentleman, a subject of the King of Great Britain, residing at Cannycourt, Brannockstown, county Kildare, Ireland, have invented a certain new and useful Sliding Bolt, of which the following is a specification.

The object of my invention is to provide a bolt of an improved construction which, while adapted to at times operate in the usual way, may also be locked by improved devices in its closed position.

In carrying out my invention I employ a bar or rod constituting the bolt proper and provide this bolt with a laterally-projecting arm containing a lock adapted to be opened and closed by a key. The bolt is mounted to slide longitudinally in guides and to turn about its axis, and the arm is adapted to enter between lugs or flanges on the frame of the bolt when the bolt is shot. The arm fits snugly in the housing formed by the lugs or flanges, and one of the lugs is formed with a recess to receive the bolt of the key-operated lock carried by the arm.

Figure 1:
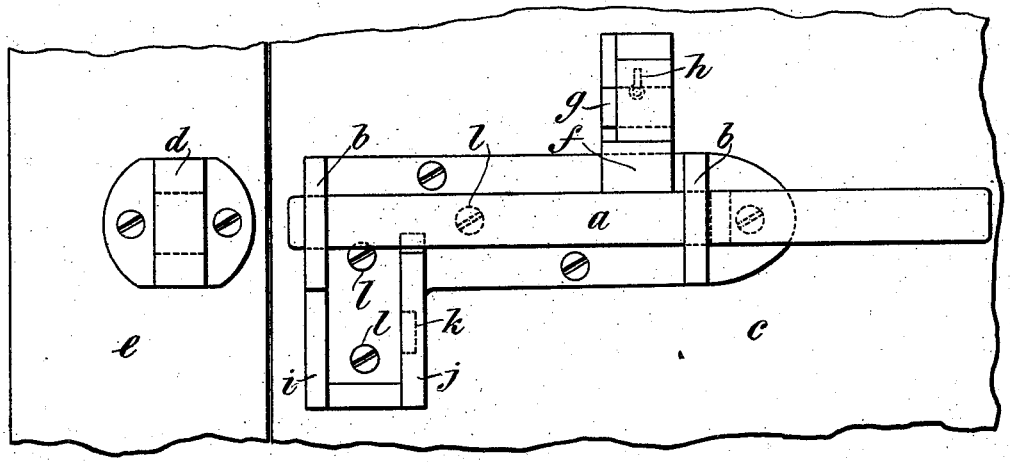
Figure 2:
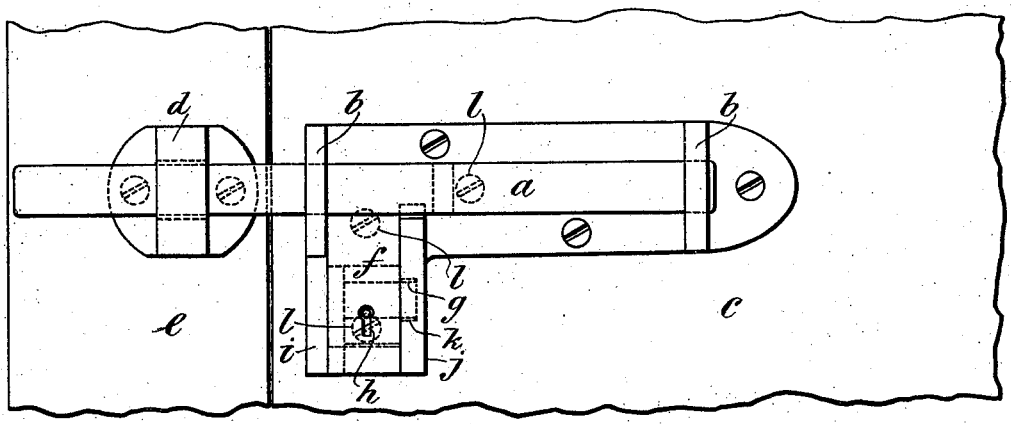

In the accompanying drawings, Figure 1 is an elevation of my improved bolt in its unshot position. Fig. 2 is a similar view showing the bolt shot and locked.

The bolt $a$ is mounted to slide and to turn in rings or guides $b$, carried by the bolt frame or casing secured to the door or gate $c$, and to engage a keeper $d$ on the gate-post $e$. An arm $f$ projects laterally or at right angles from the bolt and is rigidly secured to it. This arm carries a lock $g$ of the kind operated by a key, the keyhole being indicated at $h$.

$l$ indicates the screws for securing the case or frame of the bolt to the gate. When the bolt is shot, the screws which secure the keeper to the post $e$ are covered by the bolt. One of the screws $l$ of the bolt frame or casing is covered by the bolt, and two of the screws $l$ are covered by the arm $f$. The arm $f$ is adapted to fit snugly between two lugs or flanges $i j$, projecting forwardly from the bolt-frame, and one of these lugs is formed with a recess $k$ to receive the bolt of the key-operated lock carried by the arm $f$. A similar lug or flange connects the lower ends of the flanges $i j$.

Several advantages arise from the construction described. When the bolt is shot and the arm is within the housing formed by the lugs or flanges, it is necessary to turn the bolt before it can be made to slide longitudinally. When unlocking the bolt, only one hand is required to insert the key, turn it, and then swing the arm out of its housing and slide the bolt. The other hand of the operator is entirely disengaged or may carry a basket, bundle, or the like. The arm is so protected by the housing that the lock cannot be tampered with except through the keyhole; but when the arm is withdrawn from its housing the lock may be readily cleaned and oiled and, if necessary, taken off and repaired. The key may be inserted when the arm is in a horizontal position when it is desired to lock the gate, and then the bolt may be shot and the arm turned by applying the necessary movements to the key. In like manner after the bolt is unlocked and unshot the key may be withdrawn while the arm is in a horizontal position, this sometimes being more convenient than when the keyhole is vertical. The arm itself constitutes the means for preventing the bolt from being moved back. I do not merely use a part of the arm for this purpose. The part of the arm carrying the lock is completely housed and protected from the weather.

I claim as my invention—

1. The combination of a bolt-frame carrying guides, a bolt adapted to both slide and turn about its own axis in said guides, an arm fast with the bolt and projecting laterally therefrom, a key-operated lock carried by said arm, and a fixed lug with which the bolt of the key-operated lock engages.

2. The combination of a bolt-frame carrying guides, a bolt adapted to both slide and turn about its own axis in said guides, an arm fast with the bolt and projecting at right angles therefrom, a key-operated lock carried by said arm, and lugs or flanges on the bolt-frame between which the arm snugly fits and between which it is housed and shielded, one of said lugs being formed with a recess to receive the bolt of the lock carried by the arm.

3. The combination of a bolt-frame carrying guides, a bolt adapted to both slide and turn about its own axis in said guides, an arm fast with the bolt and projecting at right angles therefrom, a key-operated lock carried by said arm, lugs between which the arm snugly fits and between which it is housed and shielded, a keeper, and screws for securing the keeper and bolt-frame in place which are covered by the bolt and the arm when the bolt is shot and locked.

CHARLES ERNEST LONG.

Witnesses:
WM. T. SUGRUE,
WM. C. MACMAHON.